(No Model.) 7 Sheets—Sheet 1.
W. GLÜNDER.
APPARATUS FOR LOADING COAL INTO VESSELS.
No. 451,323. Patented Apr. 28, 1891.
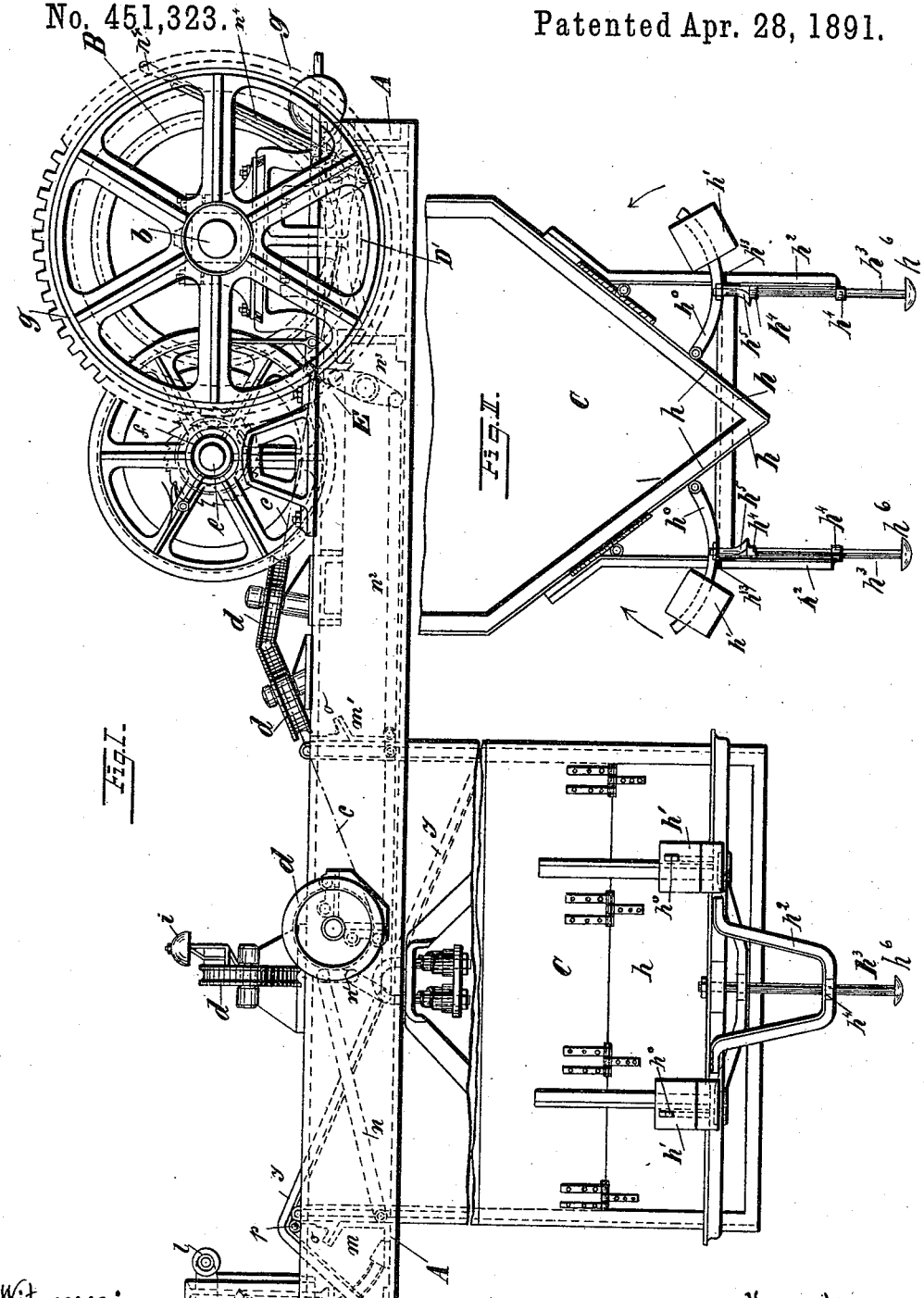

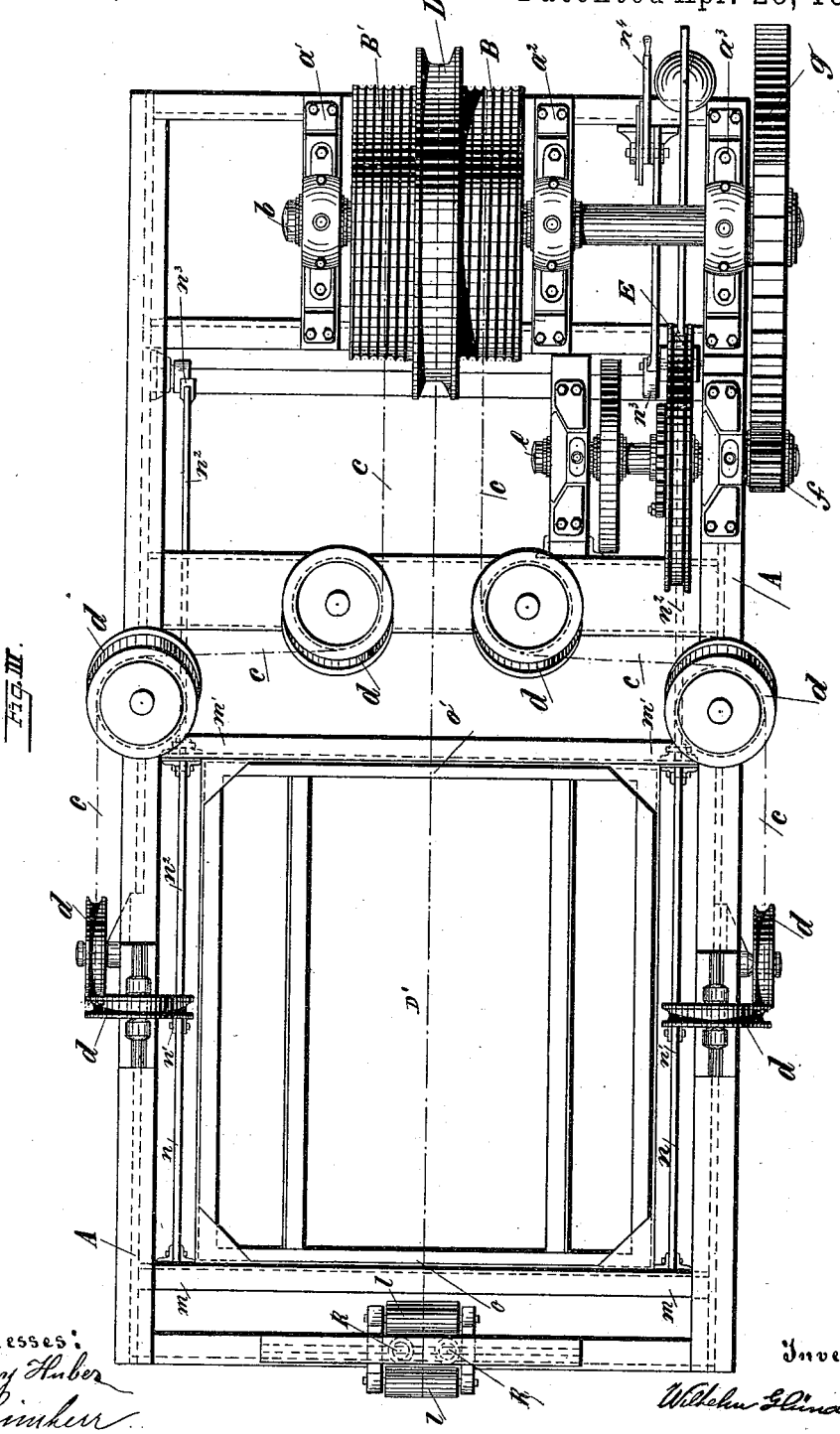

(No Model.) 7 Sheets—Sheet 3.
W. GLÜNDER.
APPARATUS FOR LOADING COAL INTO VESSELS.
No. 451,323. Patented Apr. 28, 1891.
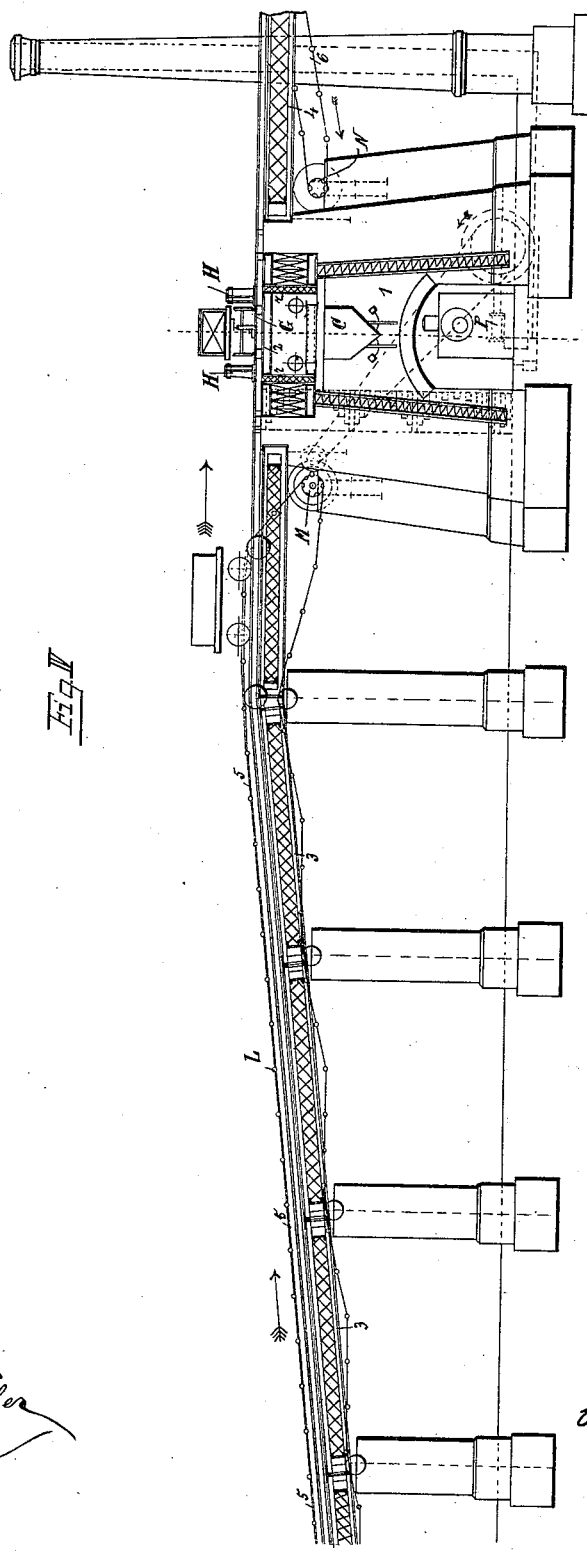

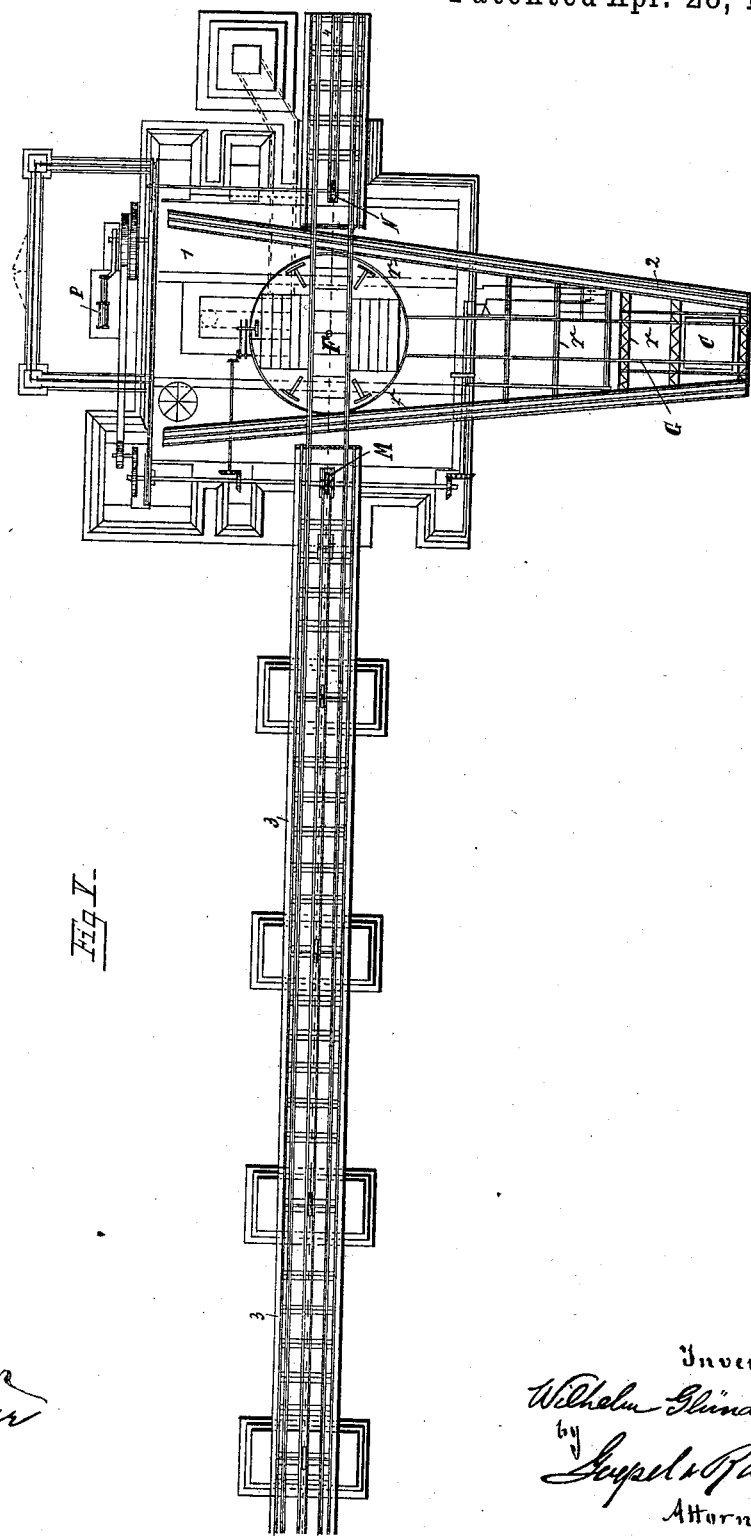

(No Model.) 7 Sheets—Sheet 5.
W. GLÜNDER.
APPARATUS FOR LOADING COAL INTO VESSELS.
No. 451,323. Patented Apr. 28, 1891.
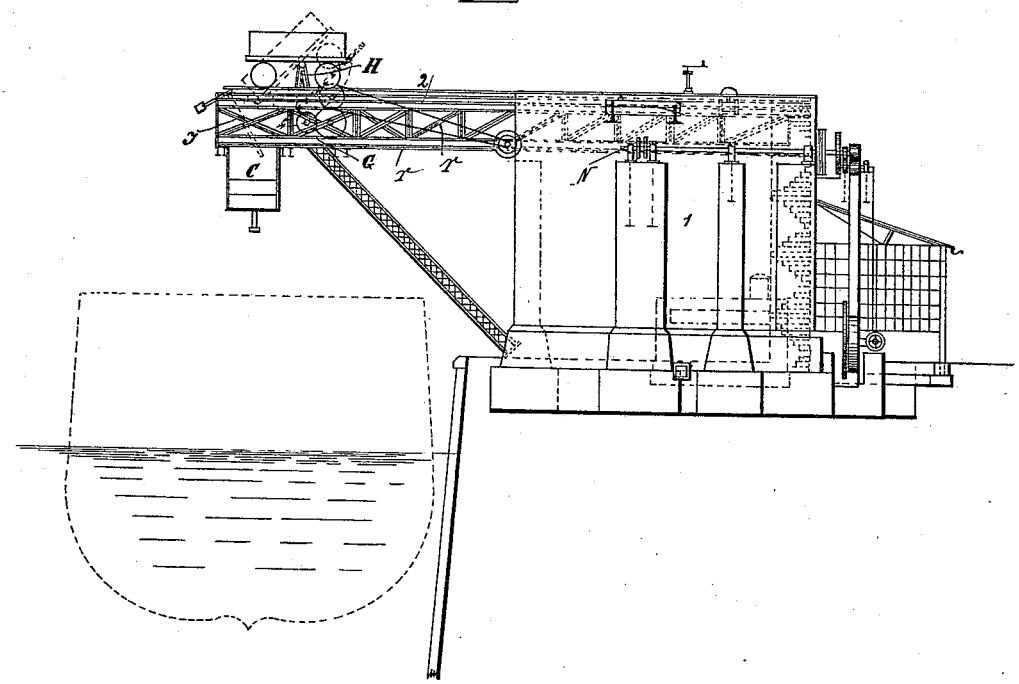

(No Model.)  7 Sheets—Sheet 6.
W. GLÜNDER.
APPARATUS FOR LOADING COAL INTO VESSELS.
No. 451,323.  Patented Apr. 28, 1891.
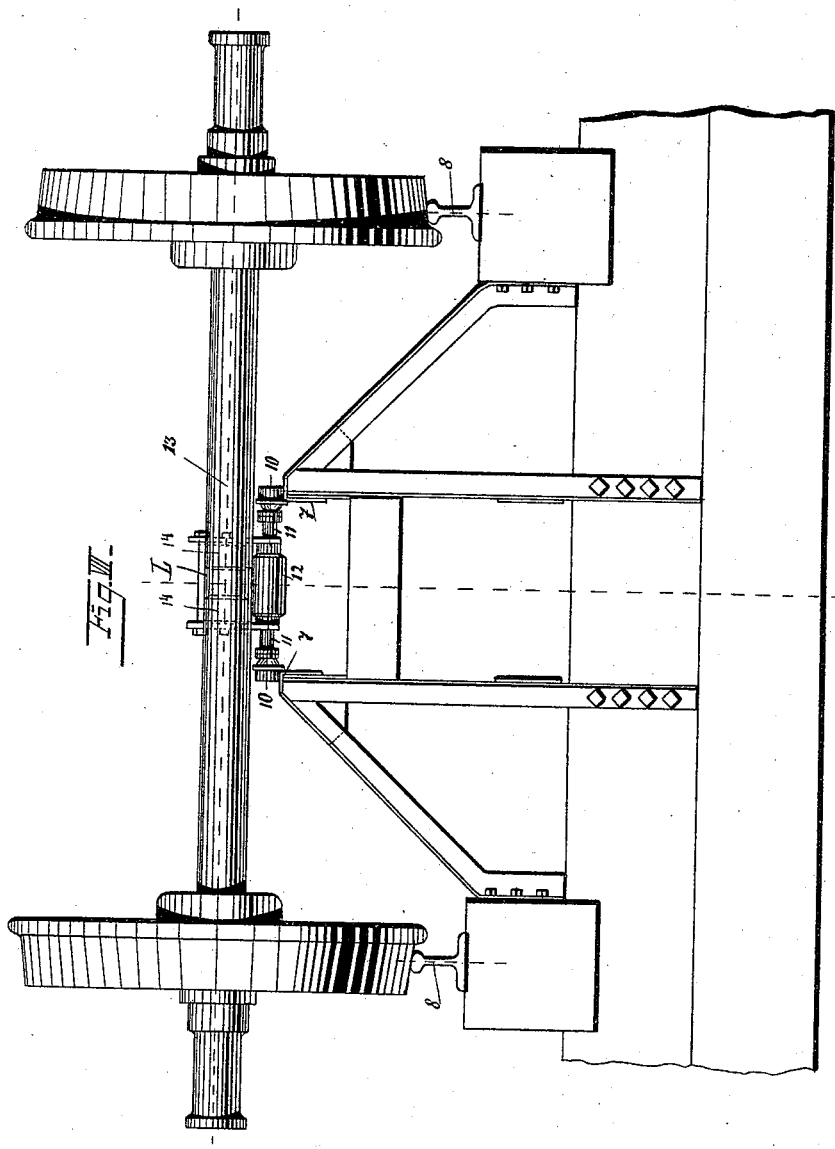

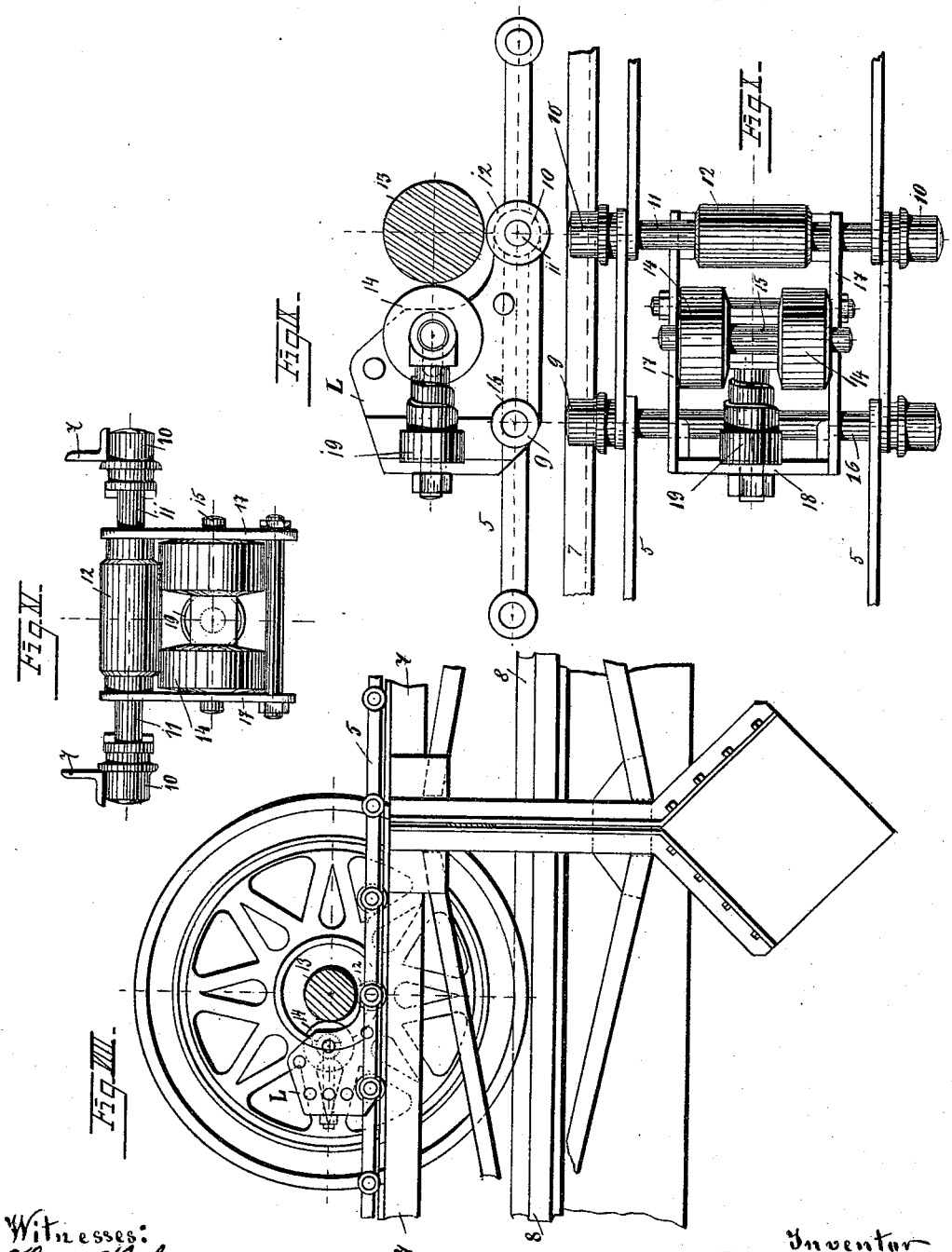

UNITED STATES PATENT OFFICE.

WILHELM GLÜNDER, OF GLATZ, GERMANY.

APPARATUS FOR LOADING COAL INTO VESSELS.

SPECIFICATION forming part of Letters Patent No. 451,323, dated April 28, 1891.

Application filed October 21, 1890. Serial No. 368,821. (No model.)

*To all whom it may concern:*

Be it known that I, WILHELM GLÜNDER, a subject of the King of Prussia, and a resident of Glatz, Germany, have invented certain new and useful Improvements in Apparatus for Loading Coals into Vessels, of which the following is a specification.

This invention relates to improvements in devices for loading coals into vessels; and the object of my invention is to provide a device of this kind, which is so constructed that it automatically opens when it arrives at the bottom of the hold of the vessel and automatically closes after the coals have been discharged.

A further object of my invention is to facilitate conveying the coals to and into the bucket.

The invention consists in the construction and combination of parts and details, which will be fully described hereinafter, and finally pointed out in the claims.

In the accompanying drawings, Figure I is a side view of my improved bucket for loading coals into vessels and of the frame and the hoisting and lowering devices for the bucket. Fig. II is an end view of the bucket, parts being broken out. Fig. III is a plan view of the bucket and the hoisting and lowering device and the frame supporting the same. Fig. IV is a side view of a structure upon which the coal-cars are run to convey the coal to my improved loading apparatus. Fig. V is a plan view of the same. Fig. VI is an end view. Fig. VII is a transverse sectional view of the track and the device for propelling the cars. Fig. VIII is a vertical longitudinal sectional view of one of the car-pushers, showing the arrangement of the track. Fig. IX is an enlarged detail longitudinal sectional view of the pushing device. Fig. X is a plan view of the same; and Fig. XI is a front elevation of the same, showing it inverted.

Similar letters and figures of reference indicate corresponding parts.

The frame A, which is adapted to be placed on the deck of the vessel and to be located in such a manner that part projects over the hatch, is suitably constructed of longitudinal and transverse beams.

In the bearings $a'$ $a^2$ $a^3$ the shaft $b$ is mounted and carries two circumferentially-grooved rope-drums B B', on which the two ropes or chains are wound that are used for raising the bucket, the shaft being rotated by hand-cranks or by means of machinery. (Not shown.) If it is desired, the empty bucket can be raised by the descending loaded bucket. The ropes or chains $c$, (represented by dotted lines,) which are adapted to be wound on the drums B B', pass over the several guide-pulleys $d$ on the frame A, and are secured in any suitable manner to the top of the bucket C.

To prevent the bucket from descending too rapidly, the band-brake E is provided, which can be controlled and operated by means of suitable levers. The band-brake E is secured on a shaft $e$, carrying a pinion $f$, which engages a cog-wheel $g$ on the end of the shaft $b$.

The bucket C fits into a suitable space in the front end of the frame A, and consists of a rectangular box open at the top and having an inclined or inverted peaked bottom. It is to be constructed of iron or any other suitable material. The inclined or peaked bottom of the bucket is provided with the two hinged gates $h$, which are held in closed position by the two weights $h'$, secured to curved arms $h^0$, pivoted to the outer sides of the gate $h$. Said arms $h^0$ rest, when the gates $h$ are closed, on the shoulders $h^3$ of the frames $h^2$, projecting downward from the bottom of the bucket. Sliding rods $h^3$, provided with heads $h^6$ at their lower ends, are guided on the rods $h^2$ by the guides $h^4$, which sliding rods $h^3$ have lugs $h^5$ above the upper guides $h^4$ to prevent the said sliding rods from descending too far—that is, when the gates $h$ are closed and the sliding rods $h^3$ are in lowered positions their upper ends are directly below the hinged arms $h$, carrying the weights $h'$. When the bucket arrives at the bottom of the hold of the vessel or upon the coal previously deposited, the sliding rods $h^3$ are pushed upward, and, acting on the hinged rods $h^0$, swing the same in the direction of the arrows, Fig. II, and when in this position they no longer hold the gates $h$ in closed position. The weight of the coal resting on said gates opens them and the coal drops out of the bucket upon the bottom of the vessel's hold or upon the coal previously deposited. When the bucket is raised, the sliding rods $h^3$ slide downward, and the weights $h'$ swing outward and downward and close the gates $h$. When the bucket is in the raised position, its top is supported within the frame A by the two sliding bars $m\ m'$, which pass under angle-bars $o$, riveted to the top part of the bucket. The two bars $m\ m$ are connected by rods $n\ n$ and a lever $n'$, one rod $n$ being connected by a rod $n^2$ with the lever $n^3$, which in turn is suitably connected with the hand-lever $n^4$. By moving said hand-lever in one direction the two bars $m$ are moved from each other, and by moving said hand-lever $n^4$ in the opposite direction said bars $m\ m'$ can be moved toward each other and under the angle-bars $o$, riveted to the top part of the bucket. When said bars $m\ m'$ are under the bars $o$ on the bucket, they hold the bucket in raised position, thus relieving the chains or rope $c$ from the weight of the bucket while the same is being filled or in the raised position. If a smaller bucket is to be used and it is to be held by the bars $m\ m'$, intermediate bars are provided and are connected with the bars $m\ m'$, before described.

Above one of the guide-pulleys $c$ a bell or gong $i$ is arranged, the hammer of which is operated by a suitable mechanism (not shown) of any desired construction during the descent of the bucket. As soon as the bucket ceases to descend the ringing of the bell stops and the operator knows that it is time to raise the bucket.

Opposite that end of the frame in which the drums B B' are arranged two horizontal rollers $l$ and two vertical rollers $k$ are arranged, and under said rollers $l$ and between the rollers $k$ a power-transmitting cable or rope D' passes in case the drums B B' are to be rotated from machinery on shore, and the apparatus is so arranged that that end of the frame carrying the rollers $l\ k$ faces the shore end. If the opposite end of the frame faces the shore end, the driving cable or rope D' passes directly to the pulley D.

To prevent the coal dumped in the bucket from striking the bottom of the same too forcibly and from being broken thereby, a guard $y$ is provided, which is mounted to turn on the shaft $p$ of the frame A. The weight of the coal sliding down the guard $y$ gradually presses the same into vertical position against the inner surface of one side of the bucket, and when the bucket descends said guard $y$ slides out of the same, and by means of a counter-weight provided thereon swings back into the inclined position, as shown in Fig. I. After the ship has been loaded the frame A is moved by means of a crane from the deck and conveyed to any other vessel which is to be loaded. The size of the bucket is governed by the size of the ship's hatches and according to the quantity of coal it is to hold.

The above-described device can also be used advantageously for depositing concrete on the bottom of rivers, &c., and in that case it is arranged to project laterally from the side of the vessel or between two vessels.

The apparatus can be used to still greater advantage by using it in connection with the construction which will now be described.

The tower 1 is erected on the shore at the loading-station, and from the same the loading-stage 2 projects, which is constructed of longitudinal and transverse beams and girders $r$. The elevation of the loading-stage 2 above the water must be such that the deck of the vessel will be below the bottom of the bucket suspended from the end of said loading-stage 2, as shown in Figs. IV and VI. The coal-cars are conducted upon the tower 1 on the inclined ways 3 and 4, arranged at opposite sides of the tower 1, of which ways one is used for conducting the filled cars to the top of the tower 1 and the other for conveying the empty cars from the tower. The coal-cars are conveyed by means of a chain and pushing devices on the same, which will now be described.

Between the rails 8, on which the wheels of the coal-cars run, two smaller rails 7 7 are arranged parallel with the rails 8 8, and at such height above the rails 8 8 that the links of the conveying-chains 5 or 6 can pass under the axles 13 of the coal-cars. The pushing devices L, Figs. VII, VIII, IX, X, and XI are secured to some of the links of the conveying-chains 5 or 6. The pushing device is provided with two rollers 10 at each side, which rollers are fixed on the axles 11 and 16, respectively. The axle 11 also supports an intermediate roller 12. On said axles 11 16 the frame is supported, composed of the side plates 17 and the rear end plate 18. In said side plate the axle 15, carrying the two rollers 14, is mounted. Said rollers are provided to prevent injury to the axle or pushing-frame in case they both do not have precisely the same elevation, and also to prevent the pushing-frame from forcing the axle upward. On the rear plate 18 a buffer-spring 19 is secured, the front end of which rests against the axle 15, carrying the rollers 14, the ends of said axle being adapted to move in slots in the side plates 17, as shown in Fig. IX in dotted lines. When the pushing device arrives at an axle 13, the rollers 14 are pressed against the rear of the axle and the roller 12 rests against the bottom of the same, said rollers 14 having about the same diameter as the axle. The endless chain on the inclined way 3 is operated by means of a sprocket-wheel M, driven by the motor P, and the endless chain on the inclined way 4 is driven by the sprocket-wheel N, also operated by the motor P. The filled coal-car is conveyed to the bottom of the incline 3 and brought to such a position that one of the pushers L on the endless chain 5 can act on one of the front axles of the car, so as to push the car to the top of the tower 1. On the turn-table F the car is turned ninety degrees, and on the tracks G it is conveyed to the end of the loading-stage 2 and upon the tilting platform H by means of a suitable pushing device like the one described, and by means of said tilting platform the contents of the car are dumped into the bucket C. As soon as the car has been emptied it is brought back to horizontal position and run back to the turn-table F, turned ninety degress and run down the incline 4.

The turn-table F is turned by means of any suitable gearing from the motor provided for operating the car-conveying cables, as is clearly shown in Fig. V.

The construction of the mechanism for transmitting motion from the motor to the turn-table may be of any approved pattern, as it has no bearing whatever on this invention. The tilting platform is operated by hand or in any other suitable manner, and is brought back into its original position by pulling down the raised end of the car after the car has been tilted.

The details of construction of the tilting platform may be of any well-known and approved pattern, as said details of construction have no bearing on this invention.

The endless chain 6 is provided with devices L, the same as the endless chain 5, but arranged in the reverse order, so that the axle can rest against said pushing devices, thus preventing the car from running down faster than the endless chain permits.

Having thus described my invention, I claim as new and desire to secure by Letters Patent—

1. The combination, with a bucket having hinged bottom gates, of latches for holding said gates in locked position, and sliding rods projecting downward from the bottom of the bucket for automatically opening said gates, substantially as set forth.

2. The combination, with a bucket, of hinged gates at the bottom of the same, weights for holding said gates in closed position, and means for automatically raising said weights to permit the gates to open when the bucket strikes a fixed object, substantially as set forth.

3. The combination, with a bucket, of hinged gates at the bottom, hinged arms carrying weights for keeping said gates in closed position, and sliding rods projecting downward from the bottom and adapted to swing up said weights to permit the gates to open, substantially as set forth.

4. The combination, with a bucket, of hinged gates at the bottom of the same, arms hinged to the gates, weights on said arms for keeping the gates closed, fixed frames projecting downward from the bucket, and sliding rods guided on said fixed frames and adapted to raise the arms carrying the weights, substantially as set forth.

5. The combination, with a frame, of a bucket, means on said frame for raising and lowering the bucket, and a hinged deflecting-plate on the frame, adapted to pass into the bucket in the direction from the top toward the bottom as the bucket is being filled, substantially as set forth.

6. The combination, with an endless chain, of frames on the same and rollers on said frames adapted to act on the axle of the car under which the chain passes, substantially as set forth.

7. The combination, with an endless chain, of frames on said chain, rollers on said frames, and a spring-buffer on said frames, which spring-buffer is adapted to bear against the rollers, said rollers being adapted to rest against the axle of the car under which the chain passes, substantially as set forth.

8. The combination, with a track, of a raised track of less width between the rails of the main track, a chain running on said raised track, a frame secured to said chain, and rollers on said frame, adapted to act on the axle of the car under which the chain passes, substantially as set forth.

9. The combination, with a tower and inclined ways leading to the same, of a loading-stage projecting from said tower, a turn-table on the tower, a tilting platform on the tower, a bucket arranged to ascend and descend at the end of the loading-stage, and means for raising and lowering said bucket, substantially as set forth.

10. The combination, with a tower, of a turn-table on the same, a loading-platform projecting from said tower, inclined ways leading to said tower, endless chains running on said inclined ways, frames on the endless chains, tracks on which said frames run, and tracks on the inclined ways, on which tracks the cars can run, the track for the frames on the endless chains being between and above the tracks for the cars, substantially as set forth.

In witness whereof I have hereunto set my hand in presence of two witnesses.

WILHELM GLÜNDER.

Witnesses:
PAUL FISCHER,
WILHELM SCHWISTHAL.